Feb. 10, 1925.
H. SCHROEDER
1,526,183
HOLDER FOR HACK SAWS
Filed July 28, 1924
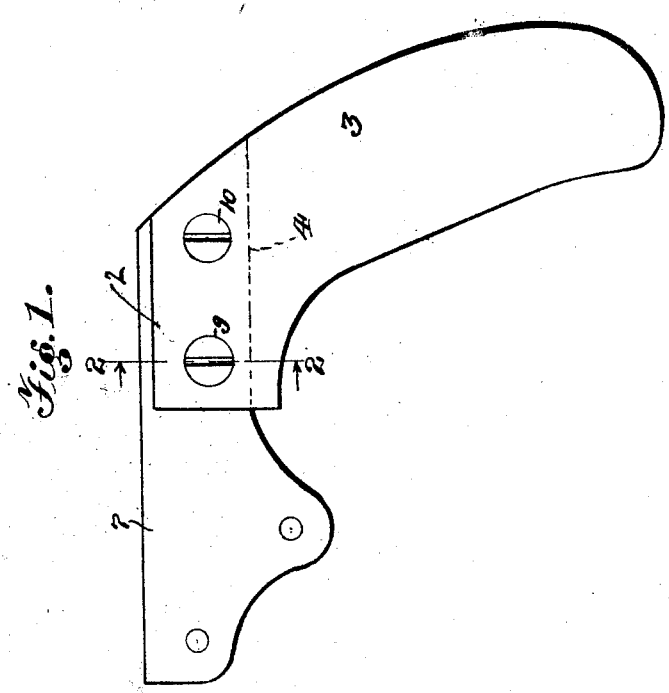
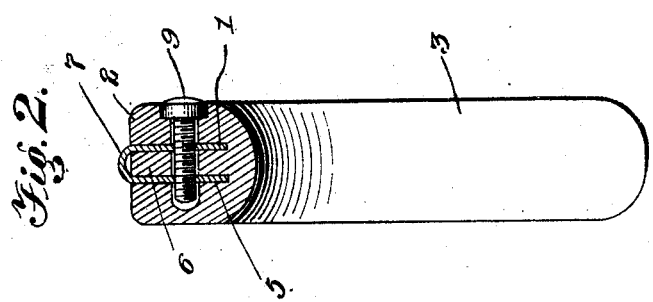
Inventor
Hugo Schroeder
Atty.

Patented Feb. 10, 1925.

1,526,183

UNITED STATES PATENT OFFICE.

HUGO SCHROEDER, OF TORRINGTON, CONNECTICUT, ASSIGNOR TO SCHROEDER BROTHERS MANUFACTURING COMPANY, OF TORRINGTON, CONNECTICUT, A CORPORATION OF CONNECTICUT.

HOLDER FOR HACK SAWS.

Application filed July 28, 1924. Serial No. 728,592.

*To all whom it may concern:*

Be it known that I, HUGO SCHROEDER, citizen of the United States of America, residing at 89 Brookside Avenue, Torrington, in the county of Litchfield and State of Connecticut, have invented certain new and useful Improvements in Holders for Hack Saws, of which the following is a specification.

This invention relates to a holder for hack saws, among the objects of the invention being the provision of an article of this character which is simple in construction and which possesses the necessary rigidity to avoid the likelihood of being shattered or fractured in use.

In the drawing accompanying and forming part of the present specification there is illustrated an advantageous form of embodiment of the invention which, to enable those skilled in the art to practice the same, will be set forth fully in the following description. Clearly I am not restricted to this exact disclosure. I may depart therefrom in several particulars within the scope of the invention defined by the claims following said description.

Referring to said drawing:

Fig. 1 is a side elevation of a handle involving the invention.

Fig. 2 is a cross section on the line 2—2 of Fig. 1, looking in the direction of the arrows.

Like characters refer to like parts in both figures.

The handle which is generally of wood involves in its make-up a shank as 2 having a downward projection as 3, which is usually grasped in the hand, is ordinarily curved and at an obtuse angle to the shank 2. As shown, the shank 2 has in it two longitudinally extending parallel grooves, as 4 and 5, which are open at the ends and the formation of which produces a fin or rib 6 which leaves the structure sufficiently rigid to resist lateral strains and stresses. The shank 2 receives within it the cheeks of a sheet metal holder, as 7, which bottom in the grooves 4 and 5 and the rear end of which is coincident with the rear surface of the shank 2, as shown best in Fig. 1.

To securely hold the holder in position screws or pins, such as 9 and 10, may be provided. As shown, the screws 9 and 10 are threaded through the shank 2 and through the cheeks 4 and 5 of the holder 7 and extend threadedwise through the fin or rib 6 and thus maintain the parts in secure relation and against vibration or chattering.

The saw holder 7 is formed up from sheet metal and when made its cheeks will straddle the rib or fin 7, as shown best in Fig. 2.

What I claim is:

A device of the class described comprising a holder of wood, having a shank furnished with an arm, the shank having therein a plurality of parallel grooves to form a fin between the grooves, and a holder straddling the fin and the cheeks of which bottom in the grooves.

In testimony whereof I affix my signature.

HUGO SCHROEDER.